US011321105B2

(12) United States Patent
Voss

(10) Patent No.: US 11,321,105 B2
(45) Date of Patent: May 3, 2022

(54) INTERACTIVE INFORMATIONAL INTERFACE

(71) Applicant: Snap Inc., Santa Monica, CA (US)

(72) Inventor: Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/028,749

(22) Filed: Sep. 22, 2020

(65) Prior Publication Data

US 2021/0004248 A1 Jan. 7, 2021

Related U.S. Application Data

(63) Continuation of application No. 16/256,602, filed on Jan. 24, 2019, now Pat. No. 10,817,317.

(51) Int. Cl.
*H04L 12/58* (2006.01)
*G06F 16/242* (2019.01)
(Continued)

(52) U.S. Cl.
CPC .......... *G06F 9/453* (2018.02); *G06F 16/243* (2019.01); *G06F 40/205* (2020.01); *H04L 51/04* (2013.01);
(Continued)

(58) Field of Classification Search
CPC ...... G06F 9/453; G06F 40/205; G06F 16/243; H04L 51/26; H04L 51/04; H04N 21/44204; H04N 21/4756
See application file for complete search history.

(56) References Cited

U.S. PATENT DOCUMENTS 7,702,508 B2 * 4/2010 Bennett ................. G06F 16/243
704/257
7,797,390 B2 9/2010 Hagale et al.
(Continued)

FOREIGN PATENT DOCUMENTS

CN 113348650 A 9/2021
IN 201741026351 A * 2/2019
(Continued)

OTHER PUBLICATIONS

New layout—any way to sort searches by view count?, Dec. 7, 2012, 1 page (Year: 2012).*
(Continued)

*Primary Examiner* — Yongjia Pan
(74) *Attorney, Agent, or Firm* — Schwegman Lundberg & Woessner, P.A.

(57) ABSTRACT

Example embodiments described herein relate to an interactive interface system to maintain a user support profile, wherein the user support profile comprises a plurality of media content that includes user support content, receive a message request from a client device wherein the message request includes an identification of the user support profile and corresponding message content that includes a natural language request, convert the natural language request to a query term, perform a query upon the plurality of media content associated with the user support profile based on the query term, identify relevant media content based on the query, and cause display of the relevant media content within a chat interface at the client device. The interfaces generated and displayed by the interactive interface system therefore enable a user to access user support without having to navigate to a separate interface.

12 Claims, 10 Drawing Sheets

(51) Int. Cl.
*G06F 9/451* (2018.01)
*H04N 21/475* (2011.01)
*H04L 51/04* (2022.01)
*H04N 21/442* (2011.01)
*H04L 51/226* (2022.01)
*G06F 40/205* (2020.01)

(52) U.S. Cl.
CPC ....... *H04L 51/26* (2013.01); *H04N 21/44204* (2013.01); *H04N 21/4756* (2013.01)

(56) References Cited

U.S. PATENT DOCUMENTS

| | | | |
|---|---|---|---|
| 7,933,338 B1 * | 4/2011 | Choudhry | G06F 16/70 |
| | | | 375/240.26 |
| 8,117,545 B2 | 2/2012 | Rosenbaum et al. | |
| 8,713,592 B2 | 4/2014 | Patterson et al. | |
| 8,775,321 B1 | 7/2014 | Mooneyham | |
| 8,843,951 B1 | 9/2014 | Sherrets et al. | |
| 9,130,779 B2 * | 9/2015 | Goyal | H04L 51/34 |
| 9,237,202 B1 * | 1/2016 | Sehn | H04L 67/26 |
| 9,262,545 B2 | 2/2016 | Covell et al. | |
| 9,367,609 B1 | 6/2016 | Mianji | |
| 9,560,400 B2 | 1/2017 | Thomas et al. | |
| 10,616,162 B1 * | 4/2020 | Zhao | H04L 51/10 |
| 11,003,669 B1 * | 5/2021 | Nelson | G06F 3/017 |
| 2005/0210396 A1 * | 9/2005 | Galli | G06F 8/00 |
| | | | 715/758 |
| 2006/0051061 A1 * | 3/2006 | Anandpura | H04N 21/25816 |
| | | | 386/216 |
| 2008/0060013 A1 | 3/2008 | Sarukkai et al. | |
| 2009/0177981 A1 * | 7/2009 | Christie | G06F 3/04883 |
| | | | 715/758 |
| 2009/0281966 A1 | 11/2009 | Biggs et al. | |
| 2010/0332522 A1 * | 12/2010 | Steidley | H04W 8/20 |
| | | | 707/769 |
| 2013/0124257 A1 | 5/2013 | Schubert | |
| 2015/0066479 A1 * | 3/2015 | Pasupalak | G06F 40/20 |
| | | | 704/9 |
| 2015/0106388 A1 | 4/2015 | Sultzaberger | |
| 2015/0121216 A1 * | 4/2015 | Brown | G06N 3/008 |
| | | | 715/707 |
| 2016/0063223 A1 | 3/2016 | Raley | |
| 2016/0094492 A1 * | 3/2016 | Li | H04L 51/02 |
| | | | 709/206 |
| 2016/0134582 A1 | 5/2016 | Rubinstein et al. | |
| 2016/0179967 A1 * | 6/2016 | Sa | G06F 16/3346 |
| | | | 707/730 |
| 2016/0219048 A1 | 7/2016 | Porras | |
| 2017/0048568 A1 | 2/2017 | Filev et al. | |
| 2017/0126592 A1 | 5/2017 | El | |
| 2017/0132019 A1 * | 5/2017 | Karashchuk | H04W 4/12 |
| 2017/0171252 A1 * | 6/2017 | Xue | H04L 65/1083 |
| 2017/0242899 A1 * | 8/2017 | Jolley | G06F 3/0485 |
| 2017/0250930 A1 * | 8/2017 | Ben-Itzhak | G06F 3/011 |
| 2017/0262139 A1 * | 9/2017 | Patel | G06F 40/169 |
| 2017/0279906 A1 * | 9/2017 | Laird-McConnell | |
| | | | H04L 67/306 |
| 2017/0289069 A1 * | 10/2017 | Plumb | G06F 9/46 |
| 2018/0218458 A1 | 8/2018 | Benfield et al. | |
| 2018/0241871 A1 | 8/2018 | Sarafa et al. | |
| 2018/0268072 A1 | 9/2018 | Rathod | |
| 2018/0295092 A1 | 10/2018 | Peiris et al. | |
| 2018/0302349 A1 | 10/2018 | Ban et al. | |
| 2019/0392926 A1 * | 12/2019 | Koh | H04L 51/08 |
| 2020/0120170 A1 | 4/2020 | Amitay et al. | |
| 2020/0241895 A1 | 7/2020 | Voss | |

FOREIGN PATENT DOCUMENTS

| | | | | |
|---|---|---|---|---|
| WO | WO-0188662 A2 | 11/2001 | | |
| WO | WO-2014174431 A1 * | 10/2014 | ........... | H04N 21/222 |
| WO | WO-2020154677 A1 | 7/2020 | | |

OTHER PUBLICATIONS

What are Skype bots and how do I add them as contacts?, retrieved from https://web.archive.org/web/20180915230101/https://support.skype.com/en/faq/FA34646/what-are-skype-bots-and-how-do-i-add-them-as-contacts, Sep. 15, 2018, 2 pages (Year: 2018).*

New update ? What do chatbots do ?, retrieved from https://www.reddit.com/r/GalaxyS9/comments/9804cg/new_update_what_do_chatbots_do/, Aug. 17, 2018, 1 page (Year: 2018).*

"U.S. Appl. No. 16/256,602, Final Office Action dated May 27, 2020", 12 pgs.

"U.S. Appl. No. 16/256,602, Non Final Office Action dated Jan. 9, 2020", 10 pgs.

"U.S. Appl. No. 16/256,602, Notice of Allowance dated Jun. 23, 2020", 7 pgs.

"U.S. Appl. No. 16/256,602, Response filed Apr. 9, 2020 to Non Final Office Action dated Jan. 9, 2020", 13 pgs.

"U.S. Appl. No. 16/256,602, Response filed Jun. 5, 2020 to Final Office Action dated May 27, 2020", 13 pgs.

"How do you search videos that were uploaded on a YouTube channel in a certain time period?", Stack Exchange, [Online] Retrieved from the Internet: <URL: https://webapps.stackexchange.com/questions/50169/how-do-you-search-videos-that-were-uploaded-on-a-youtube-channel-in-a-certain-ti>, (Oct. 14, 2017), 3 pgs,.

"International Application Serial No. PCT/US2020/015076, International Search Report dated May 22, 2020", 3 pgs.

"International Application Serial No. PCT/US2020/015076, Written Opinion dated May 22, 2020", 4 pgs.

"Is YouTube really showing the most-viewed videos on a channel?", Stack Overflow, [Online] Retrieved from the Internet: <URL: https://stackoverflow.com/questions/42713038/is-youtube-really-showing-the-most-viewed-videos-on-a-channel>, (Mar. 15, 2017), 2 pgs.

"Issue No. 614—Media is not being 'unfurled' in ephemeral messages", GitHub, [Online] Retrieved from the Internet: <URL: https://github.com/slackapi/node-slack-sdk/issues/614>, (Aug. 12, 2018), 3 pgs.

"Search videos from a specific channel with Youtube API v3", Stack Overflow, [Online] Retrieved from the Internet: <URL: https://stackoverflow.com/questions/25775090/search-videos-from-a-specific-channel-with-youtube-api-v3>, (Sep. 11, 2014), 2 pgs.

"YouTube API—Search for video in specific channel", Stack Overflow, [Online] Retrieved from the Internet: <URL: https://stackoverflow.com/questions/49819966/youtube-api-search-for-video-in-specific-channel>, (Apr. 14, 2018), 2 pgs.

Bokil, Sneha, "Telegram now lets you share disappearing photo and videos", FoneArena, [Online] Retrieved from the Internet: <URL: https://www.fonearena.com/blog/225736/telegram-now-lets-you-share-disappearing-photo-and-videos.html>, (Jul. 24, 2017), 3 pgs.

Constine, Josh, "How Stories Search makes Snapchat a real-time YouTube", TechCrunch, [Online] Retrieved from the Internet: <URL: https://techcrunch.com/2017/03/31/snaptube/>, (Mar. 31, 2017), 3 pgs.

Lavi, Shai, "Introducing Secret Messages", Rakuten Viber, [Online] Retrieved from the Internet: <URL: https://www.viber.com/en/blog/2017-01-31/introducing-secret-messages/>, (Jan. 31, 2017), 2 pgs.

U.S. Appl. No. 16/256,602, filed Jan. 24, 2019, Interactive Informational Interface.

* cited by examiner

```
                                    400
                                      ↘

┌─────────────────────────────────────────────────────────────────┐
│  RECEIVING MEDIA CONTENT AT A SERVER SYSTEM, THE MEDIA CONTENT  │
│       COMPRISING MEDIA DATA AND A MEDIA IDENTIFIER              │
│                             402                                 │
└─────────────────────────────────────────────────────────────────┘
                                  │
                                  ▼
┌─────────────────────────────────────────────────────────────────┐
│   ASSOCIATING THE MEDIA CONTENT WITH A PROFILE AT THE SERVER    │
│   SYSTEM, THE PROFILE COMPRISING A PLURALITY OF MEDIA CONTENT   │
│          THAT INCLUDE ASSOCIATED MEDIA IDENTIFIERS              │
│                             404                                 │
└─────────────────────────────────────────────────────────────────┘
                                  │
                                  ▼
┌─────────────────────────────────────────────────────────────────┐
│  RECEIVING A MESSAGE REQUEST FROM A CLIENT DEVICE, THE MESSAGE  │
│     REQUEST COMPRISING AN IDENTIFICATION OF THE PROFILE AND     │
│                        MESSAGE CONTENT                          │
│                             406                                 │
└─────────────────────────────────────────────────────────────────┘
                                  │
                                  ▼
┌─────────────────────────────────────────────────────────────────┐
│     PERFORMING A QUERY UPON THE PLURALITY OF MEDIA CONTENT      │
│      ASSOCIATED WITH THE PROFILE RESPONSIVE TO THE MESSAGE      │
│      REQUEST, THE QUERY INCLUDING THE MESSAGE CONTENT OF THE    │
│                        MESSAGE REQUEST                          │
│                             408                                 │
└─────────────────────────────────────────────────────────────────┘
                                  │
                                  ▼
┌─────────────────────────────────────────────────────────────────┐
│   IDENTIFYING THE MEDIA CONTENT BASED ON THE MEDIA IDENTIFIER OF│
│             THE MEDIA CONTENT AND THE QUERY                     │
│                             410                                 │
└─────────────────────────────────────────────────────────────────┘
                                  │
                                  ▼
┌─────────────────────────────────────────────────────────────────┐
│ CAUSING DISPLAY OF A PRESENTATION OF THE MEDIA CONTENT AT THE   │
│ CLIENT DEVICE IN RESPONSE TO THE IDENTIFYING THE MEDIA CONTENT  │
│  BASED ON THE QUERY PERFROMED RESPONSIVE TO THE MESSAGE         │
│                        REQUEST                                  │
│                             412                                 │
└─────────────────────────────────────────────────────────────────┘
```

```
ACCESSING A USER INTERACTION HISTORY OF A USER PROFILE
ASSOCIATED WITH THE CLIENT DEVICE, THE USER INTERACTION
HISTORY COMPRISING USER INTERACTION DATA THAT INCLUDE
TIMESTAMPS THAT INDICATE A TEMPORAL ATTRIBUTE ASSOCIATED WITH
THE USER INTERACTION DATA
502

IDENTIFYING A FIRST SUBSET OF THE USER INTERACTION DATA THAT
OCCURRED PRIOR TO THE MESSAGE REQUEST, AND A SECOND SUBSET
OF THE USER INTERACTION DATA THAT OCCURRED SUBSEQUENT TO
THE MESSAGE REQUEST BASED ON THE TIMESTAMPS
504

GENERATING A FIRST ENGAGEMENT SCORE OF THE USER PROFILE
BASED ON THE FIRST SUBSET OF THE USER INTERACTION DATA AND THE
TIMESTAMPS OF THE FIRST SUBSET OF THE USER INTERACTION DATA,
THE FIRST ENGAGEMEN SCORE INDICATING A FIRST USAGE RATE OF THE
USER PROFILE
506

GENERATING A SECOND ENGAGEMENT SCORE OF THE USER PROFILE
BASED ON THE SECOND SUBSET OF THE USER INTERACTION DATA AND
THE TIMESTAMPS OF THE SECOND SUBSET OF THE USER INTERACTION
DATA, THE SECOND ENGAGEMENT SCORE INDICATING A SECOND USAGE
RATE OF THE USER PROFILE
508

GENERATING A VISUALIZATION THAT COMPRISES A COMPARISON OF THE
FIRST USAGE RATE AND THE SECOND USAGE RATE
510
```

UPDATING A VIEW-COUNT OF THE MEDIA CONTENT IN RESPONSE TO THE CAUSING DISPLAY OF THE PRESENTATION OF THE MEDIA CONTENT AT THE CLIENT DEVICE
602

GENERATING A RANKING OF THE MEDIA CONTENT AMONG THE PLURALITY OF MEDIA CONTENT BASED ON THE VIEW-COUNT
604

RECEIVING A REQUEST TO ACCESS THE PROFILE FROM THE CLIENT DEVICE
606

PRESENTING THE PROFILE AT THE CLIENT DEVICE IN RESPONSE TO THE REQUEST TO ACCESS THE PROFILE, THE PROFILE COMPRISING A DISPLAY OF THE PLURALITY OF MEDIA CONTENT THAT INCLUDES THE MEDIA CONTENT AT A POSITION WITHIN THE DISPLAY OF THE PLURALITY OF MEDIA CONTENT, THE POSITION BASED ON THE RANKING OF THE MEDIA CONTENT
608

*FIG. 6*

INTERACTIVE INFORMATIONAL INTERFACE

CLAIM OF PRIORITY

This application is a continuation of U.S. patent application Ser. No. 16/256,602, filed on Jan. 24, 2019, which is incorporated herein by reference in its entirety.

TECHNICAL FIELD

Embodiments of the present disclosure relate generally to graphical user interfaces (GUI), and more particularly, to systems for generating and causing display of GUIs to convey information.

BACKGROUND

Natural language processing (NLP) is a subfield of artificial intelligence concerned with the interactions between computers and human (natural) languages, in particular how to process and analyze natural language data. Through NLP, a user input can be analyzed to extract relevant information to perform specific operations.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating a method for causing display of an interactive information interface, according to certain example embodiments.

FIG. 5 is a flowchart illustrating a method for causing display of an interactive informational interface, according to certain example embodiments.

FIG. 6 is a flowchart illustrating a method for causing display of an interactive informational interface, according to certain example embodiments.

DETAILED DESCRIPTION

Figure 1:
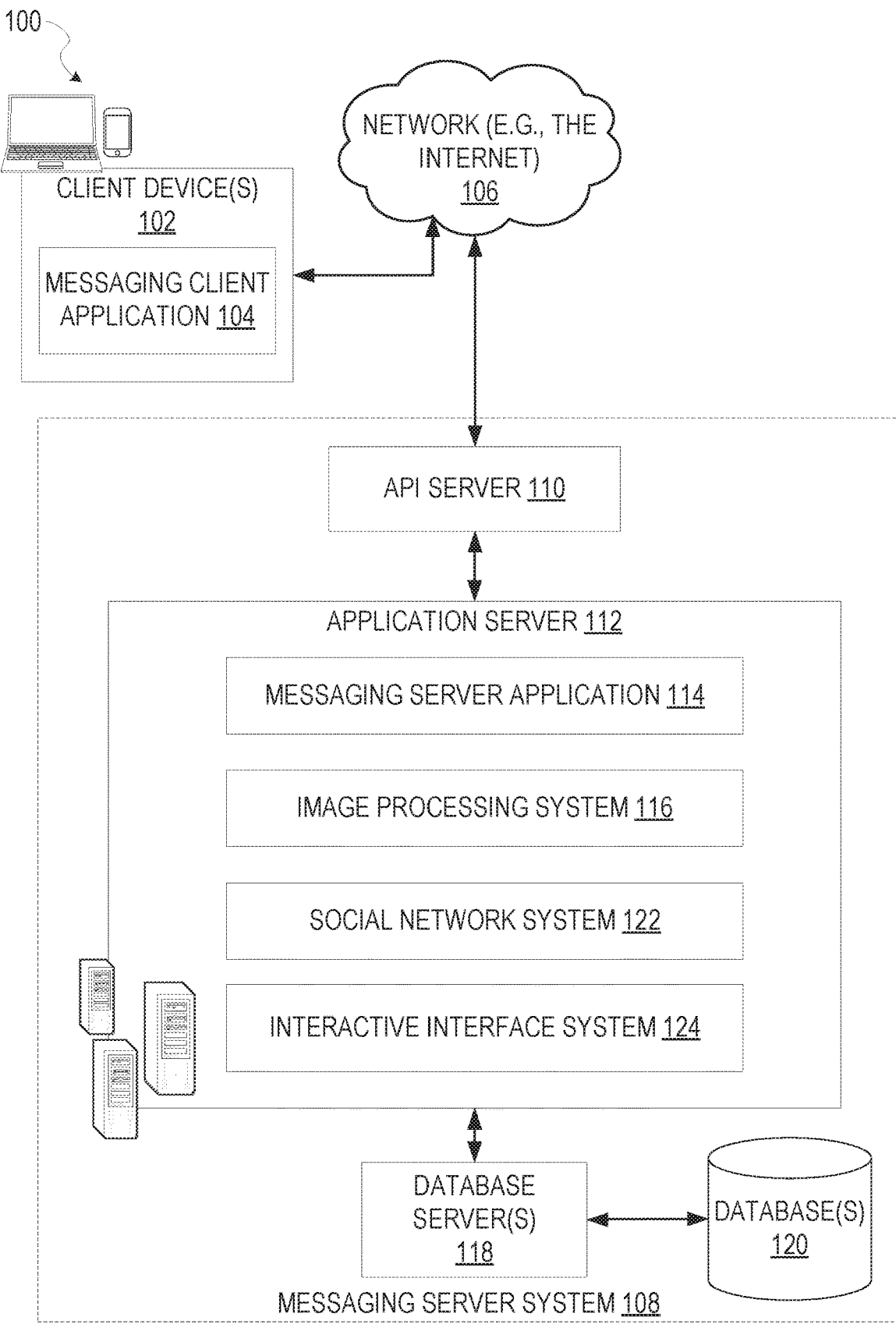
FIG. 1 is a block diagram showing an example messaging system for exchanging data (e.g., messages and associated content) over a network in accordance with some embodiments, wherein the messaging system includes an interactive interface system.

User support describes a range of customer services to assist users in using features of applications or programs. User support is most often delivered by means of phone-call, or through a live support website. While such methods may be effective in assisting users, maintaining a call center to provide round-the-clock support to users can be costly for businesses, and finding a specific support website through a link on a webpage is often cumbersome or confusing for inexperienced users. For example, a link to a support website may be displayed at a position on a webpage, or may be accessed through a menu displayed within an interface.

As discussed above, through NLP, a user input can be analyzed to extract relevant information to perform specific operations. The system disclosed below provides an improvement to existing user support resources, by providing an intuitive series of interfaces to access a user support interface that summarizes and displays pertinent information to a user based on natural language requests received from the user. The disclosed system therefore provides a particular, more intuitive, manner in which a user support interface may be accessed by a user, and moreover a specific manner of curating and displaying information to a user within a graphical user interface.

Example embodiments described herein relate to an interactive interface system to maintain a user support profile, wherein the user support profile comprises a plurality of media content that includes user support content, receive a message request from a client device wherein the message request includes an identification of the user support profile and corresponding message content that includes a natural language request, convert the natural language request to a query term, perform a query upon the plurality of media content associated with the user support profile based on the query term, identify relevant media content based on the query, and cause display of the relevant media content within a chat interface at the client device. The interfaces generated and displayed by the interactive interface system therefore enable a user to access user support without having to navigate to a separate interface.

Access to the user support profile may be presented to the user through their normal user contacts list. For example, a user contacts list associated with a user profile may be updated to include a profile identifier corresponding to the user support profile, such that a user may create and send messages to the user support profile as they would to any of their contacts. Messages received at the user support profile may thereby be processed using NLP techniques to identify relevant query terms which may be used by the interactive interface system to retrieve media content, such as user support content, to be presented to the user within a chat interface. For example, according to certain embodiments, to access the user support content, a user may either provide an input to generate a message, and identify the user support profile as the recipient of the message, or may also navigate to a profile page of the user support profile by selected the user support profile from among a list of user contacts. The user support profile may therefore be displayed to the user as any other user profile.

According to certain embodiments, the interactive interface system may perform operations that include accessing a user interaction history of a user profile, wherein the user interaction history comprises user interaction data that include timestamps and indicate a rate in which a user associated with the user profile uses certain features of an application. For example, the user interaction data may indicate that the user uses the application for 3 hours a day, that the user sends 30 messages a day, and that the user uses a specific set of functions of the application. Based on the user interaction history, the interactive interface system can identify a first subset of the user interaction data that occurred prior to the user accessing user support content, and a second subset of the user interaction data that occurred subsequent to the user accessing the user support content.

The interactive interface system may then generate a first and second engagement score to be assigned to the user account, wherein the first engagement score indicates a usage rate of the user prior to the user support content, and the second engagement score indicates a usage rate of the user subsequent to the user support content. The interactive interface system may provide an interface to view visualizations of a comparison of the first and second engagement scores. For example, the visualizations may include bar charts, pie charts, and graphs.

In some embodiments, the interactive interface system may score the plurality of media content based on a view-count of the media content. For example, every time content from among the media content is presented at a device, the interactive interface system may increment a view-count associated with the media content. In further embodiments, the interactive interface system may only increment the view-count of a particular media content in response to detecting an increase in a user engagement score subsequent to exposure to the media content.

In some embodiments, the presentation of the user support content may include an ephemeral message displayed at the client device, wherein the ephemeral message comprises a display duration granting a user of the client device access to the user support content for a predefined period of time. For example, the ephemeral message may be presented to the client in a chat interface such that the user may select the ephemeral message to cause display of the user support content for a predefined period of time. In some embodiments, the predefined period of time may be based on attributes of the user support content itself. For example, in a case where the user support content comprises video data, the predefined time period may be defined as a number of video-plays. In further embodiments, the ephemeral message may be displayed in the chat interface for a period of time, such as a day.

Consider an illustrative example from a user perspective. A user of the interactive interface system generates a message request, wherein the message request include message content (e.g., "How do I add filters to my stories?") as well as an identification of the user support profile as a recipient of the message content. Responsive to receiving the message request, the interactive interface system detects natural language content within the message content and processes the natural language content using NLP techniques to generate one or more query terms.

Responsive to generating the one or more query terms, the interactive interface system accesses a media content repository that comprises a collection of user support content in response to the message request and performs a search query upon the collection of user support content, using the one or more query terms, to identify pertinent content. For example, each piece of media content may be tagged within the media content repository with relevant query terms, as well as an identifier or title. Based on the query, the interactive interface system identifies a plurality of media content (e.g., user support content) that may be relevant.

Responsive to identifying the plurality of media content, the interactive interface system may rank the plurality of media content to identify a most relevant media content. For example, the ranking may be based on a view-count associated with the media content, or in some embodiments may be based on a lift associated with the media content, wherein the lift is determined based on a comparison of a user engagement score of a user before and after exposure to the media content. The interactive interface system may then cause display of a presentation of the most relevant media content within a chat interface at the client device. The user of the client device may interact with the media content by providing an input that selects the content. In response to receiving the input that selects the content, the interactive interface system presents an ephemeral display of the media content for a predefined time period.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an interactive interface system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
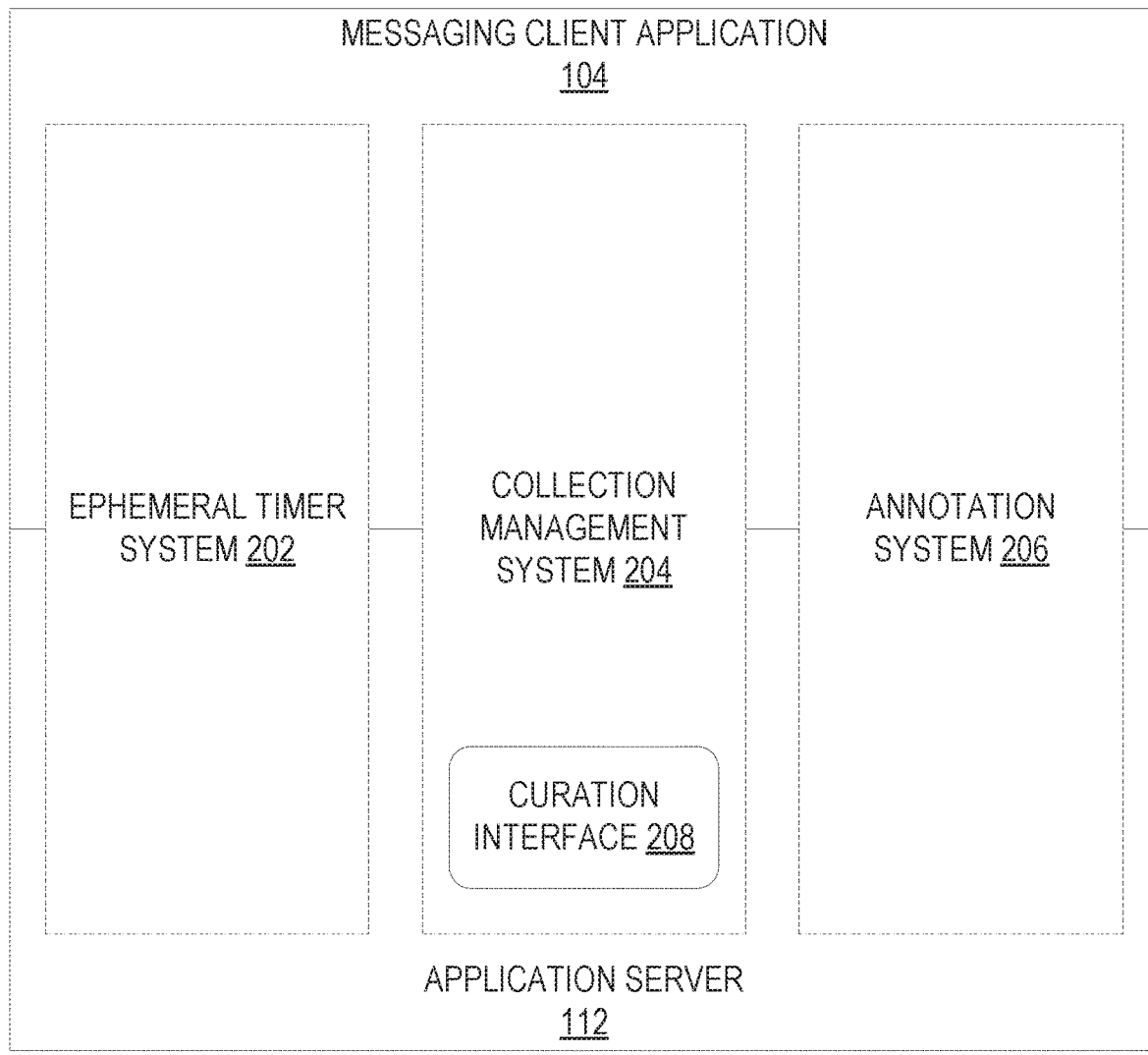
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content, such as user support content received by the user to be forwarded or redistributed to one or more recipients. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
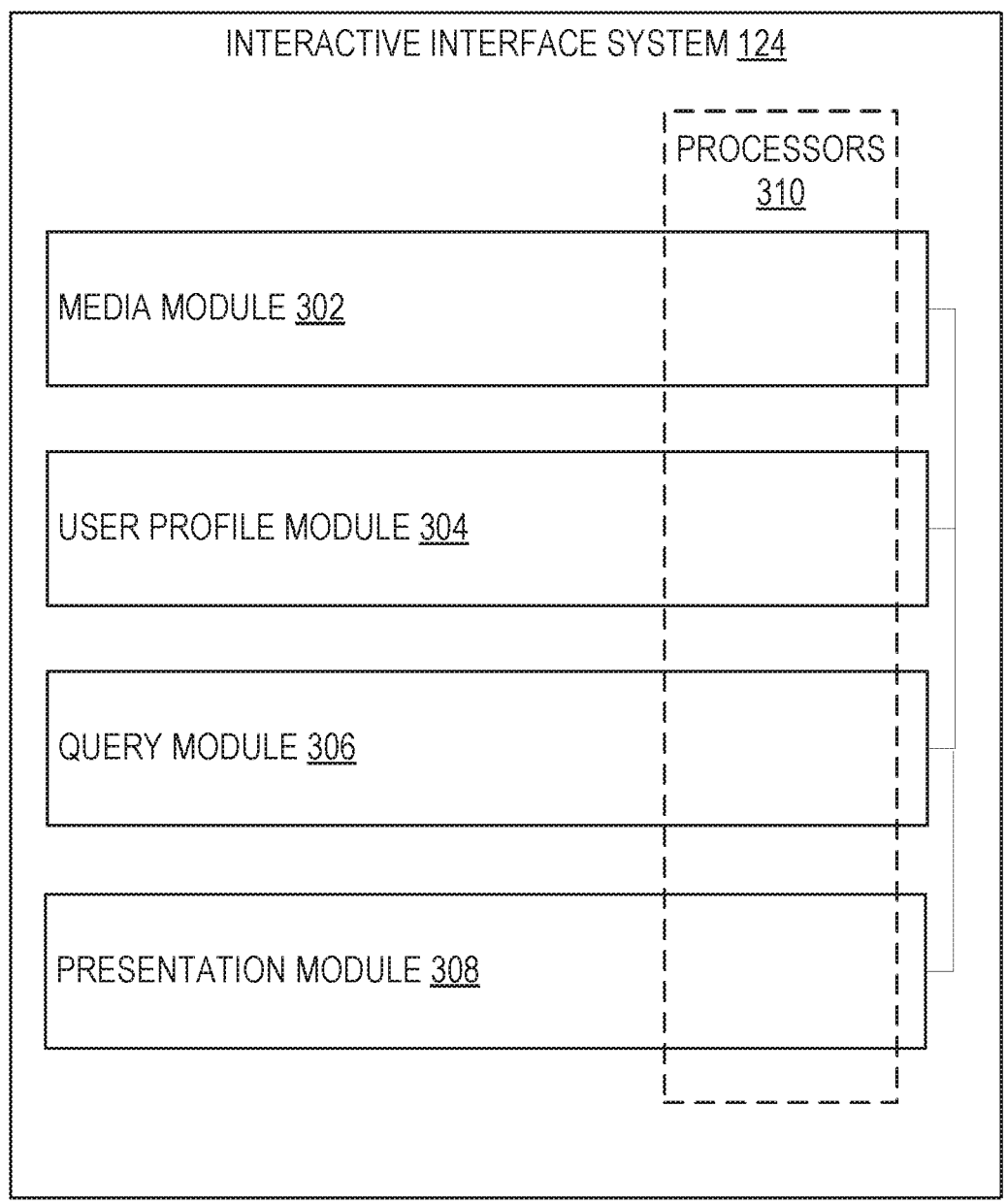
FIG. 3 is a block diagram illustrating various modules of an interactive interface system, according to certain example embodiments.

In another example embodiment, the annotation system 206 provides a merchant-based publication platform that enables merchants to select a particular media overlay associated with a geolocation. For example, the annotation system 206 associates the media overlay of a highest bidding merchant with a corresponding geolocation for a predefined amount of time FIG. 3 is a block diagram illustrating components of the interactive interface system 124 that configure the interactive interface system 124 to maintain a user support profile, wherein the user support profile comprises a plurality of media content that includes user support content, receive a message request from a client device wherein the message request includes an identification of the user support profile and corresponding message content that includes a natural language request, convert the natural language request to a query term, perform a query upon the plurality of media content associated with the user support profile based on the query term, identify relevant media content based on the query, and cause display of the relevant media content within a chat interface at the client device. The interactive interface system 124 is shown as including a media module 302, a user profile module 304, a query module 306, and a presentation module 308, all configured to communicate with each other (e.g., via a bus, shared memory, or a switch).

Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the interactive interface system 124 may physically include an arrangement of one or more of the processors 310 (e.g., a subset of or among the one or more processors of the machine) configured to perform the operations described herein for that module. As another example, any module of the interactive interface system 124 may include software, hardware, or both, that configure an arrangement of one or more processors 310 (e.g., among the one or more processors of the machine) to perform the operations described herein for that module. Accordingly, different modules of the interactive interface system 124 may include and configure different arrangements of such processors 310 or a single arrangement of such processors 310 at different points in time. Moreover, any two or more modules of the interactive interface system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating a method 400 for causing display of an interactive information interface, according to certain example embodiments.

Operations of the method 400 may be performed by the modules described above with respect to FIG. 3. As shown in FIG. 4, the method 400 includes one or more operations 402, 404, 406, 408, 410, and 412.

At operation 402, the media module 302 receives media content, wherein the media content comprises media data and a media identifier. For example, the media content may include a video, image, or audio file which can be identified by the media identifier.

At operation 404, the media module 302 associates the media content with a profile, such as a user support profile, wherein the profile comprises a plurality of media content, and wherein the plurality of media content each have corresponding media identifiers. For example, the plurality of media content may include a set of user support videos, wherein each video is identified by a video identifier, such as a title, or media tag.

Figure 9:
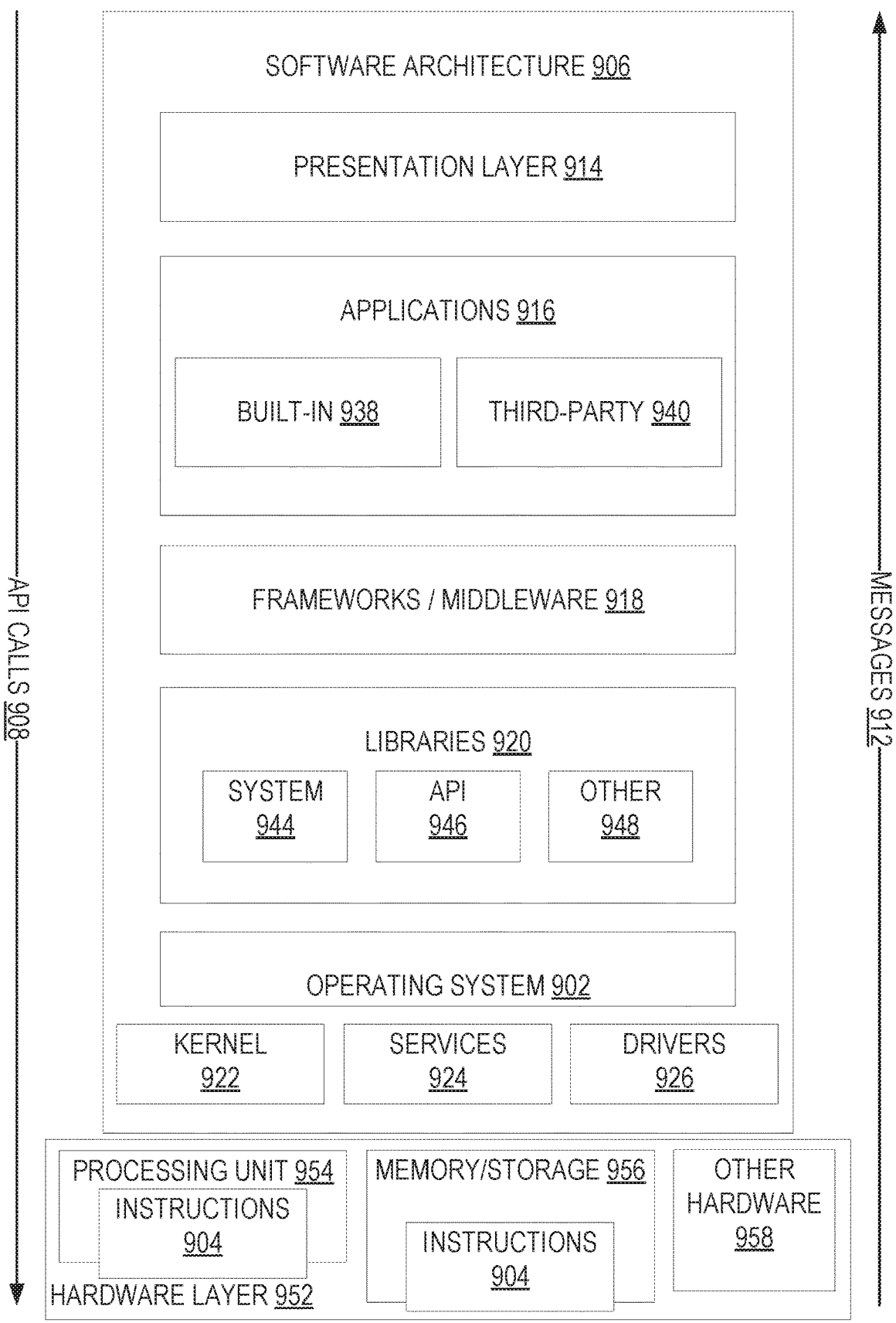
FIG. 9 is a block diagram illustrating a representative software architecture, which may be used in conjunction with various hardware architectures herein described and used to implement various embodiments.

At operation 406, the query module 306 receives a message request from a client device 102, wherein the message request comprises an identification of the profile and message content, wherein the message content includes a natural language request. For example, a user of the client device 102 may provide an input to compose a message. Responsive to the input, the presentation module 308 causes display of a message composition interface, as depicted in FIG. 9, wherein the message composition interface comprises input fields to receive a user input identifying a recipient, and a user input providing message content that comprises a natural language content (e.g., a text string).

At operation 408, responsive to receiving the message request, the query module 306 performs a query upon the plurality of media content associated with the profile. In some embodiments, responsive to detecting natural language content within the message request, the query module performs NLP upon the message request in order to identify one or more query terms.

The query module 306 may then perform the query upon the plurality of media content based on the one or more query terms identified within the message content, and at operation 410, identifies relevant media content based on the query.

At operation 412, the presentation module 308 causes display of a presentation of the media content at the client device 102. According to certain embodiments, the presentation of the media content may be presented in a chat interface, as depicted in FIG. 9, wherein the presentation of the message content includes an ephemeral message with an associated display duration.

FIG. 5 is a flowchart illustrating a method 500 for causing display of an interactive information interface, according to certain example embodiments. Operations of the method 500 may be performed by the modules described above with respect to FIG. 3. As shown in FIG. 5, the method 500 includes one or more operations 502, 504, 506, 508, and 510, that may be performed as a part of (e.g., a subroutine) the method 400 depicted in FIG. 4.

At operation 502, the user profile module 304 accesses a user interaction history of a user profile associated with the client device 102, wherein the user interaction history of the user profile comprises user interaction data that includes timestamps that indicate a time and date in which the user interactions occurred. For example, the user interaction data may comprise a log of user requests with corresponding timestamps.

At operation 504, the user profile module 304 identifiers a first subset of the user interaction data that occurred prior to exposure to user support content, and a second subset of the user interaction data that occurred subsequent to the exposure to the user support content. For example, the user profile module 304 may identify an exposure to user support content among the user interaction data, wherein the exposure to the user support content includes a timestamp. Based on the timestamp, the user profile module 304 may partition the user interaction data to identify the first subset and the second subset.

At operation 506, the user profile module 304 generates a first engagement score to be assigned to the user profile based on the first subset of the user interaction data and one or more timestamps corresponding with the first subset of the user interaction data. For example, the first engagement score may indicate a first usage rate in which the user of the client device 102 used an application of the client device 102, prior to exposure to the user support content.

At operation 508, the user profile module 304 generates a second engagement score to be assigned to the user profile based on the second subset of the user interaction data and one or more timestamps corresponding with the second subset of the user interaction data. For example, the second engagement score may indicate a second usage rate in which the user of the client device 102 used the application of the client device 102, subsequent to the exposure to the user support content.

At operation 510, the presentation module 308 generates a visualization that comprises a comparison of the first usage rate and the second usage rate. For example, the visualization may include a bar chart, a graph, a pie chart, or other similar visualization to convey a change in the usage rate.

FIG. 6 is a flowchart illustrating a method 600 for causing display of an interactive information interface, according to certain example embodiments.

Operations of the method 600 may be performed by the modules described above with respect to FIG. 3. As shown in FIG. 6, the method 600 includes one or more operations 602, 604, 606, and 608, that may be performed as a part of (e.g., a subroutine) the method 400 depicted in FIG. 4.

At operation 602, responsive to operation 412 of the method 400 as depicted in FIG. 4, wherein the presentation module 308 causes display of a presentation of the media content at the client device 102, the media module 302 updates a view-count of the user support content (i.e., media content) in response to the causing display of the presentation of the media content at the client device 102.

In some embodiments, the interactive interface system 124 may perform the method 500 as depicted in FIG. 5 in order to determine whether or not the exposure to the media content at the client device 102 resulted in a net increase in the user's usage rate. Responsive to determining that the usage rate of the user increased subsequent to exposure to the user support content, the media module 302 increments the view-count of the media content.

At operation 604, the media module 302 generates a ranking score of the media content based on the view-count of the media content. The ranking score may indicate a ranking of the media content among the plurality of media content.

At operation 606, the user profile module 304 receives a request to access the profile from the client device 102. Responsive to receiving the request, at operation 608 the presentation module 308 causes display of a presentation of the profile at the client device 102, wherein the presentation of the profile includes a display of the plurality of media content associated with the profile including the media content ranked by the media module 302, and wherein a position of the media content within the display of the plurality of media content is based on the ranking score.

Figure 7:
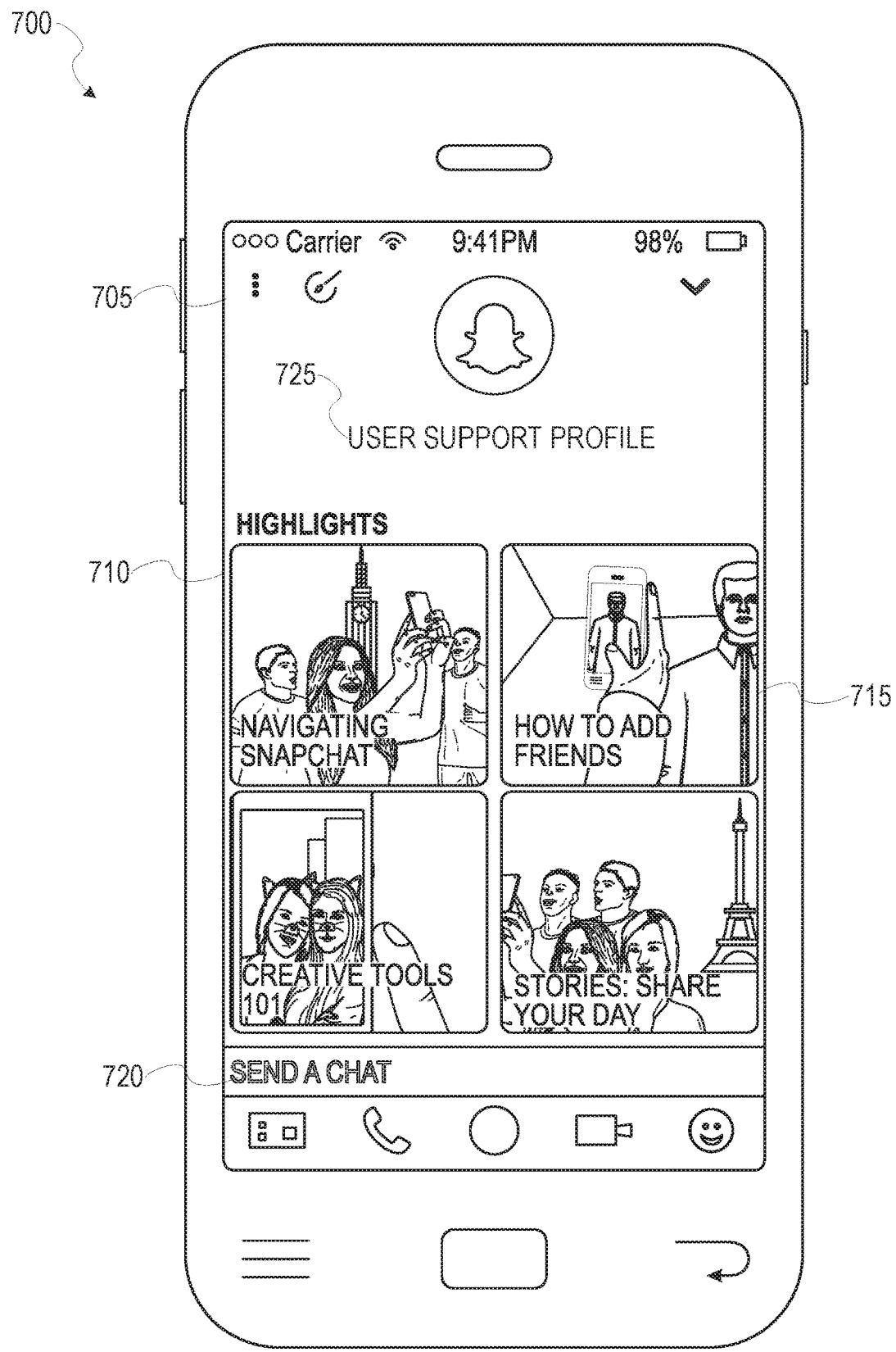
FIG. 7 is an interface diagram depicting an interactive information interface, according to certain example embodiments.

FIG. 7 is an interface diagram 700 depicting an interactive information interface 705, and as discussed in the methods 400, 500, and 600 as depicted in FIGS. 4, 5, and 6.

As seen in the interface diagram 700, the interactive information interface 705 comprises a display of a profile identifier 725 that identifies a user support profile which may be accessed by a user through the user's contact list. For example, the profile identifier 725 may be displayed among a user's contacts or address book, such that responsive to a user input selecting the profile identifier 725 from among the user's contacts or address book, the interactive interface system 124 causes display of the interactive interface 705 at the client device 102.

As discussed in the method 400, the interactive information interface 705 may comprise a presentation of a plurality of media content 710. As seen in the interface diagram 700, the presentation of the plurality of media content 710 includes a media content 715.

According to certain embodiments, an administrator of the interactive interface system 124 may add or remove media content from the presentation of the plurality of media content 710 as needed.

Figure 8:
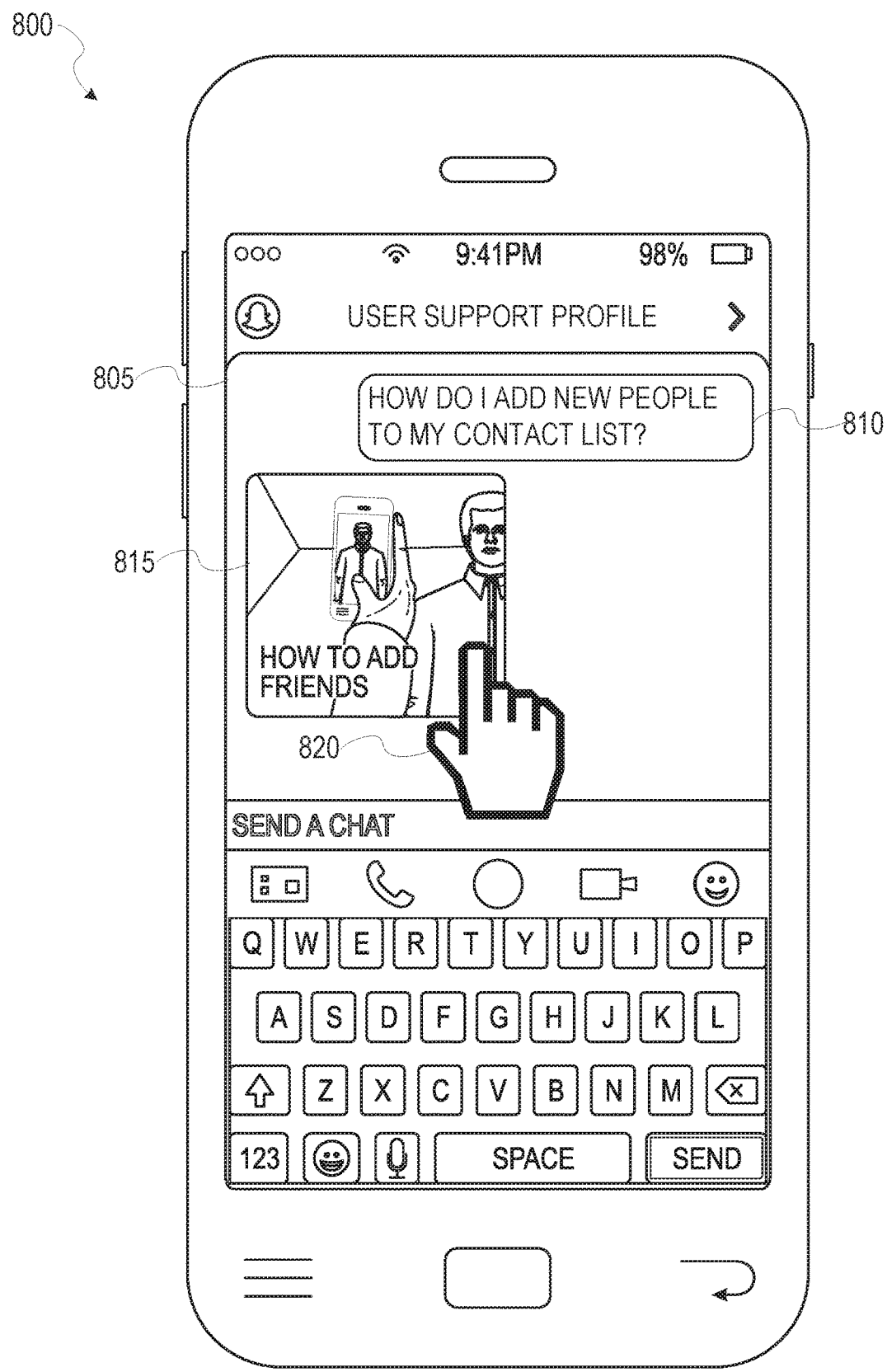
FIG. 8 is an interface diagram depicting a message composition interface, according to certain example embodiments.

As discussed in the method 400, a user of the client device 102 may provide an input selecting the graphical icon 720, and in response, the interactive interface system 124 may generate and cause display of a message composition interface, as depicted in FIG. 8.

FIG. 8 is an interface diagram 800 depicting message composition interface 805, according to certain example embodiments. As seen in FIG. 8, the message composition interface 805 may include a display of one or more messages, including message content 810 from a message request as described in the method 400 depicted in FIG. 4.

According to certain embodiments, responsive to retrieving media content based on the message content 810, the presentation module 308 causes display of a presentation of the media content 815 within the message composition interface 805.

In some embodiments, the presentation of the media content 815 may include an ephemeral message, wherein the presentation module 308 may display the media content of the presentation of the media content 815 for a predefined period of time based on attributes of the media content of the presentation of the media content. For example, responsive to an input 820, the presentation module 308 displays the media content from the presentation of the media content 815 for a predefined period of time.

Software Architecture

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as the machine 1000 of FIG. 10 that includes, among other things, processors 1004, memory 1014, and I/O components 1018. A representative hardware layer 952 is illustrated and can represent, for example, the machine 900 of FIG. 9. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, applications 916 and a presentation layer 914. Operationally, the applications 916 and/or other components within the layers may invoke application programming interface (API) API calls 908 through the software stack and receive a response as in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROIDT™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924 and/or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Figure 10:
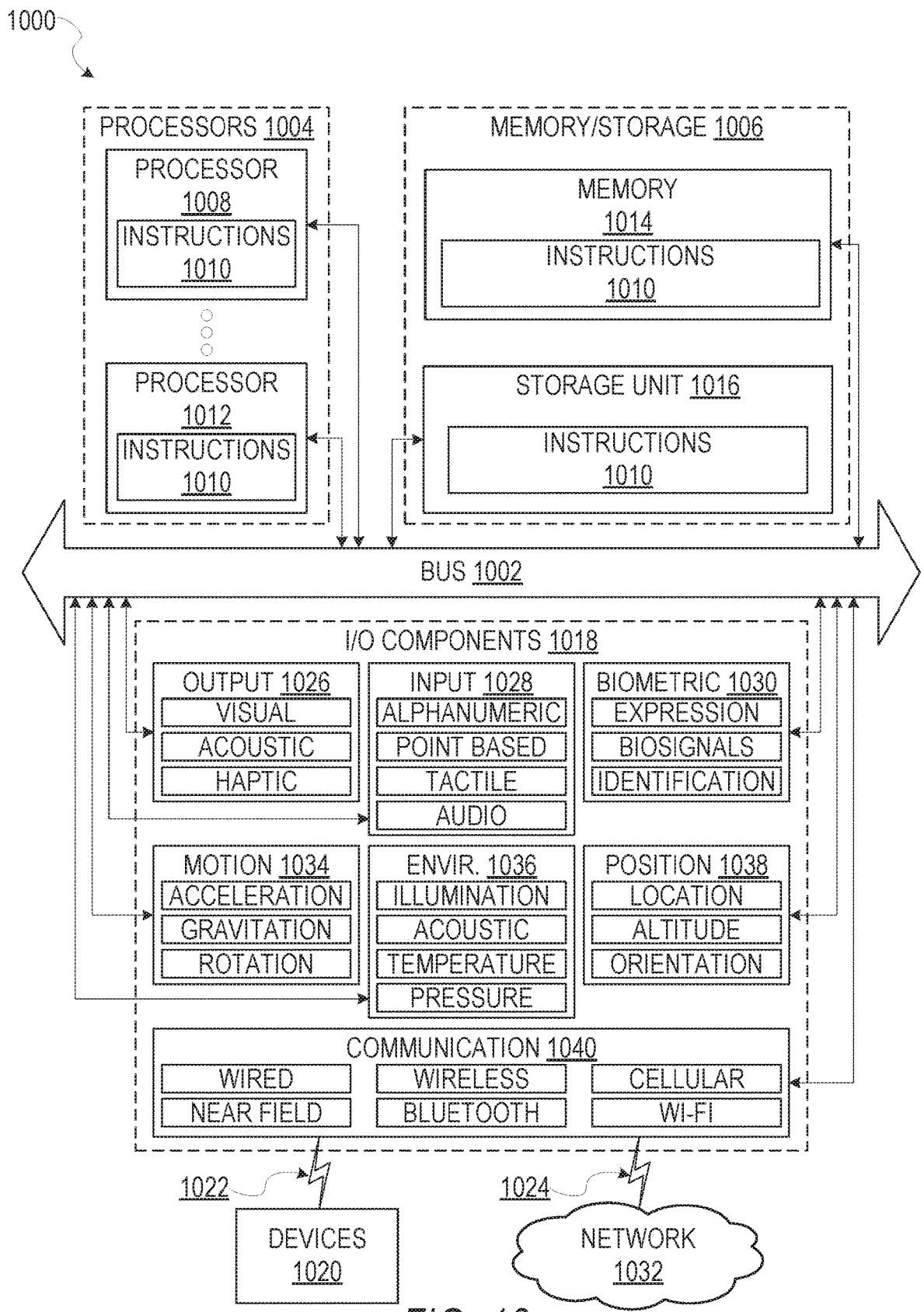
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the/O components 1018 may include many other components that are not shown in FIG. 10. The/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental environment components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   causing display of a list of user contacts at a client device, the list of user contacts including an identifier associated with a user profile;
   receiving a selection of the identifier associated with the user profile from the client device;
   causing display of a messaging interface at the client device in response to the selection of the identifier associated with the user profile;
   receiving a query to be performed upon a collection of media content associated with the user profile via the messaging interface;
   accessing a plurality of media content from among the collection of media content based on the query, the plurality of media content including a media content;
   ranking the media content among the plurality of media content based on an engagement score associated with the media content, the engagement score indicating a usage rate of a user before and after exposure to the media content;
   selecting the media content from among the plurality of media content based on the ranking the media content including video data;
   generating a response to the query based on the media content; and
   causing display of a presentation of the response to the query within a chat interface at the client device for a period of time, the period of time defined by a number of video plays of the video data associated with the media content.

2. The method of claim 1, wherein the response to the query includes content that comprises a display duration, and the method further comprises:
   receiving an input that selects the presentation of the response to the query at the client device; and
   causing display of the content of the response to the query based on the display duration.

3. The method of claim 1, wherein the query includes a natural language query, and wherein the method further comprises:
   determining a query term based on the natural language query; and
   identifying the media content based on the query term.

4. The method of claim 1, wherein the presentation of the response to the query includes a display of a user identifier associated with the user profile.

5. A system comprising:
   a memory; and
   at least one hardware processor coupled to the memory and comprising instructions that causes the system to perform operations comprising:
   causing display of a list of user contacts at a client device, the list of user contacts including an identifier associated with a user profile;

receiving a selection of the identifier associated with the user profile from the client device;

causing display of a messaging interface at the client device in response to the selection of the identifier associated with the user profile;

receiving a query to be performed upon a collection of media content associated with the user profile via the messaging interface;

accessing a plurality of media content from among the collection of media content based on the query, the plurality of media content including a media content;

ranking the media content among the plurality of media content based on an engagement score associated with the media content, the engagement score indicating a usage rate of a user before and after exposure to the media content;

selecting the media content from among the plurality of media content based on the ranking the media content including video data;

generating a response to the query based on the media content; and causing display of a presentation of the response to the query within a chat interface at the client device for a period of time, the period of time defined by a number of video plays of the video data associated with the media content.

6. The system of claim 5, wherein the response to the query includes content that comprises a display duration, and the operations further comprise:

receiving an input that selects the presentation of the response to the query at the client device; and causing display of the content of the response to the query based on the display duration.

7. The system of claim 5, wherein the query includes a natural language query, and wherein the operations further comprise:

determining a query term based on the natural language query; and identifying the media content based on the query term.

8. The system of claim 5, wherein the presentation of the response to the query includes a display of a user identifier associated with the user profile.

9. A non-transitory machine-readable storage medium comprising instructions that, when executed by one or more processors of a machine, cause the machine to perform operations comprising:

causing display of a list of user contacts at a client device, the list of user contacts including an identifier associated with a user profile;

receiving a selection of the identifier associated with the user profile from the client device;

causing display of a messaging interface at the client device in response to the selection of the identifier associated with the user profile;

receiving a query to be performed upon a collection of media content associated with the user profile via the messaging interface;

accessing a plurality of media content from among the collection of media content based on the query, the plurality of media content including a media content;

ranking the media content among the plurality of media content based on an engagement score associated with the media content, the engagement score indicating a usage rate of a user before and after exposure to the media content;

selecting the media content from among the plurality of media content based on the ranking the media content including video data;

generating a response to the query based on the media content; and causing display of a presentation of the response to the query within a chat interface at the client device for a period of time, the period of time defined by a number of video plays of the video data associated with the media content.

10. The non-transitory machine-readable storage medium of claim 9, wherein the response to the query includes content that comprises a display duration, and the operations further comprise:

receiving an input that selects the presentation of the response to the query at the client device; and causing display of the content of the response to the query based on the display duration.

11. The non-transitory machine-readable storage medium of claim 9, wherein the query includes a natural language query, and wherein the operations further comprise:

determining a query term based on the natural language query; and identifying the media content based on the query term.

12. The non-transitory machine-readable storage medium of claim 9, wherein the presentation of the response to the query includes a display of a user identifier associated with the user profile.

* * * * *